United States Patent
Tanaka

(10) Patent No.: US 11,174,373 B2
(45) Date of Patent: Nov. 16, 2021

(54) RESIN COMPOSITION AND RESIN MOLDED BODY

(71) Applicant: FUJIFILM BUSINESS INNOVATION CORP., Tokyo (JP)

(72) Inventor: Ryo Tanaka, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/255,013

(22) Filed: Jan. 23, 2019

(65) Prior Publication Data

US 2019/0153200 A1 May 23, 2019

Related U.S. Application Data

(63) Continuation of application No. PCT/JP2017/013998, filed on Apr. 3, 2017.

(30) Foreign Application Priority Data

Dec. 15, 2016 (JP) .............................. JP2016-243483

(51) Int. Cl.
| | | |
|---|---|---|
| C08L 1/00 | (2006.01) | |
| C08L 1/14 | (2006.01) | |
| C08L 3/06 | (2006.01) | |
| B29C 45/00 | (2006.01) | |
| C08L 1/10 | (2006.01) | |
| B29K 1/00 | (2006.01) | |

(52) U.S. Cl.
CPC ................ *C08L 1/14* (2013.01); *B29C 45/00* (2013.01); *B29C 45/0001* (2013.01); *C08L 1/10* (2013.01); *C08L 3/06* (2013.01); *B29K 2001/08* (2013.01); *B29K 2003/00* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 5,280,055 A | 1/1994 | Tomka | |
| 5,446,140 A | 8/1995 | Maheras et al. | |
| 5,478,386 A * | 12/1995 | Itoh ........................ | A24D 3/068 |
| | | | 428/532 |
| 5,507,304 A | 4/1996 | Maheras et al. | |
| 6,506,824 B1 | 1/2003 | Bastioli et al. | |
| 6,730,724 B1 | 5/2004 | Bastioli et al. | |
| 2010/0040806 A1 | 2/2010 | Suzuki et al. | |
| 2010/0069535 A1* | 3/2010 | Suzuki ..................... | C08J 5/18 |
| | | | 524/37 |

FOREIGN PATENT DOCUMENTS

| | | | |
|---|---|---|---|
| CN | 1580110 A | 2/2005 | |
| CN | 101680989 A | 3/2010 | |
| JP | H06-207047 A | 7/1994 | |
| JP | H06-329832 A | 11/1994 | |
| JP | H07-102114 A | 4/1995 | |
| JP | 08143710 A * | 6/1996 | ................ C08L 1/10 |
| JP | H08-143710 A | 6/1996 | |
| JP | 2533764 B2 | 9/1996 | |
| JP | H08-231762 A | 9/1996 | |
| JP | 2002-523598 A | 7/2002 | |
| JP | 2007-310260 A | 11/2007 | |
| JP | 2010-189655 A | 9/2010 | |
| WO | 96/016116 A1 | 5/1996 | |

OTHER PUBLICATIONS

English translation of JP-08143710-A (Year: 1996).*
Jun. 1, 2017 Search Report issued in International Application No. PCT/JP2017/013998.
Jun. 13, 2017 Written Opinion issued in International Application No. PCT/JP2017/013998.
Aug. 31, 2020 Office Action issued in Chinese Patent Application No. 201780056479.2.
Jan. 30, 2018 Office Action issued in Japanese Patent Application No. 2016-243483.
Apr. 2, 2021 Office Action issued in Chinese Patent Application No. 201780056479.2.

* cited by examiner

*Primary Examiner* — Stefanie J Cohen
(74) *Attorney, Agent, or Firm* — Oliff PLC

(57) ABSTRACT

A resin composition containing: a cellulose ester having at least two types of acyl groups; and an esterified starch.

8 Claims, No Drawings

RESIN COMPOSITION AND RESIN MOLDED BODY

CROSS-REFERENCE TO RELATED APPLICATIONS

This is a continuation of International Application No. PCT/JP2017/013998 filed on Apr. 3, 2017 and claims priority from Japanese Patent Application No. 2016-243483 filed on Dec. 15, 2016.

BACKGROUND

Technical Field

The present invention relates to a resin composition and a resin molded body.

Related Art

The cellulose ester is generally a resin obtained by esterifying a plant-derived cellulose with a carboxylic acid. The resin composition containing a cellulose ester is used for molding of various parts, housings and the like of electronic and electrical appliances, office equipment, home appliances, and vehicles and the like.

For example, Patent Literature 1 discloses a fatty acid cellulose ester resin composition containing a fatty acid cellulose ester, a weak organic acid, a thioether compound, a phosphite ester compound, and an epoxy compound.

For example, Patent Literature 2 discloses a resin composition containing an esterified starch having a degree of substitution of 0.4 or more, an esterified cellulose having a degree of substitution of 0.4 or more, and an ester plasticizer.

CITATION LIST

Patent Literature

Patent Literature 1: JPB 2533764
Patent Literature 2: JPA H08-143710

SUMMARY

Aspects of non-limiting embodiments of the present disclosure relate to provide a resin composition containing a cellulose ester having at least two types of acyl groups, which is excellent in thermal fluidity and excellent in rigidity when formed into a molded body, as compared with a case where an esterified starch is not contained.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a resin composition comprising a cellulose ester having at least two types of acyl groups and an esterified starch.

DETAILED DESCRIPTION

Exemplary embodiments of the invention will be described below. These descriptions and examples illustrate exemplary embodiments and do not limit the scope of the invention. The mechanism of action described herein includes an estimate, which does not limit the scope of the invention.

When the amount of each component in the composition is mentioned in the present disclosure, in a case where a plural types of substances corresponding to the each component are present in the composition, the amount of each component means the total amount of the plural types of substances present in the composition unless otherwise specified.

<Resin Composition>

The resin composition according to the exemplary embodiment contains: a cellulose ester having at least two types of acyl groups; and an esterified starch.

Since cellulose esters such as cellulose acetate are generally poor in thermal fluidity due to the intramolecular and intermolecular hydrogen bonds working, in order to provide a molding method (for example, injection molding) in which the resin composition is thermally flowed and molded, a plasticizer is conventionally added to increase the thermal fluidity. However, when the plasticizer is added, the rigidity of the molded body tends to decrease. The present inventor has been found that the thermal fluidity of the resin composition is improved and the rigidity of the molded body is improved when the esterified starch is added to a cellulose ester having at least two types of acyl groups (hereinafter, also referred to as "cellulose mixed acid ester") among cellulose esters. It has been found that when the esterified starch is added, the thermal fluidity of the resin composition is improved and the rigidity of the molded body is improved. When the esterified starch is added to the cellulose acetate, the thermal fluidity of the resin composition is improved while the rigidity of the molded body is decreased, while the thermal fluidity of the resin composition is improved and the rigidity of the molded body is improved when the esterified starch is added to the cellulose mixed acid ester.

The following is presumed as a mechanism of improving the thermal fluidity of cellulose acetate and cellulose mixed acid ester by addition of esterified starch. It is considered that since the esterified starch has a similar structure to the cellulose ester, it has a high affinity for the cellulose ester, and thus may be dispersed uniformly to the cellulose ester. It is considered that the esterified starch that has entered between the cellulose ester molecules attenuates the hydrogen bond between the cellulose ester molecules, thereby improving the thermal fluidity of the cellulose acetate and the cellulose mixed acid ester.

The following is presumed as a mechanism of decreasing the rigidity of the molded body when the esterified starch is added to the cellulose acetate, whereas improving the rigidity of the molded body when the esterified starch is added to the cellulose mixed acid ester.

Since the cellulose acetate has one type of acyl group, molecules tend to align in the molded body, and an attractive force (hydrogen bond or Van der Waals force) between molecules acts strongly, and as a result, it is considered that the cellulose acetate exhibits excellent rigidity. When the esterified starch is added to such cellulose acetate, alignment of molecules in the molded body is disturbed, and the rigidity is considered to be lowered.

On the other hand, since the cellulose mixed acid ester has at least two types of acyl groups, alignment of molecules in the molded body of the cellulose mixed acid ester is disturbed to some extent. When an esterified starch is added to the cellulose mixed acid ester, the degree of alignment of the molecules is increased as a whole in the molded body, and an attractive force (hydrogen bond or Van der Waals force)

easily acts between the molecules, and the rigidity is considered to be increased. However, since the esterified starch enters between the cellulose mixed acid ester molecules, the alignment of the molecules is easily disturbed by heat application, and it is considered that higher thermal fluidity than the cellulose mixed acid ester alone is exhibited.

Hereinafter, the material, composition, and manufacturing methods of the resin composition according to the exemplary embodiment will be described in detail.

[Cellulose Esters (Cellulose Mixed Acid Esters) Having at Least Two Types of Acyl Groups]

A cellulose ester having at least two types of acyl groups has a structure in which at least parts of hydroxyl groups of cellulose are substituted with at least two types of acyl groups by esterifying the cellulose with at least two types of carboxylic acids. In the present specification, a "cellulose ester having at least two types of acyl groups" is also referred to as a "cellulose mixed acid ester".

Examples of the acyl group contained in the cellulose mixed acid ester include: aliphatic acyl groups such as acetyl group, propionyl group, butyryl group, isobutyryl group, valeryl group, pivaloyl group, hexanoyl group, octanoyl group, decanoyl group, lauroyl group, and stearoyl group; aromatic acyl groups such as a benzoyl group and a naphthoyl group; and the like. Examples of the cellulose mixed acid ester include cellulose acetate propionate, cellulose acetate butyrate, cellulose propionate butyrate, cellulose acetate hexanoate, cellulose acetate octanoate, cellulose acetate decanoate, cellulose acetate benzoate, cellulose propionate benzoate, cellulose butyrate benzoate, cellulose acetate propionate butyrate, and cellulose propionate butyrate benzoate, and the like. These cellulose mixed acid esters may be used alone or in combination of two or more types thereof.

The acyl group contained in the cellulose mixed acid ester is preferably an aliphatic acyl group, more preferably an aliphatic acyl group having a total carbon number of 2 to 6, still more preferably a linear aliphatic acyl group having the same total number of carbon atoms, and particularly preferably an acetyl group, a propionyl group or a butyryl group. One exemplary embodiment of the cellulose mixed acid ester is a cellulose ester having at least two types of acyl groups selected from the group consisting of an acetyl group, a propionyl group and a butyryl group.

One exemplary embodiment of the cellulose mixed acid ester is a cellulose ester having an acetyl group and at least one aliphatic acyl group other than the acetyl group. The aliphatic acyl group other than the acetyl group is preferably an aliphatic acyl group having a total carbon number of 3 to 6, more preferably a linear aliphatic acyl group having the same total number of carbon atoms, and particularly preferably a propionyl group or a butyryl group.

The cellulose mixed acid ester is particularly preferably a cellulose ester selected from cellulose acetate propionate (CAP) and cellulose acetate butyrate (CAB). The ratio of the degree of substitution of the acetyl group to the propionyl group or the butyryl group in the CAP or CAB is preferably the former:latter=5:1 to 1:20, and more preferably 3:1 to 1:15.

The degree of acyl group substitution of the cellulose mixed acid ester (total degree of substitution of the total acyl group) is preferably from 1.0 to 3.0, more preferably from 1.8 to 2.9, and still more preferably from 2.3 to 2.8.

When the degree of substitution is compared between the acyl group having the lowest degree of substitution and the acyl group having the highest degree of substitution, the acyl group of the plural types of the cellulose mixed acid ester preferably has a ratio of the former:latter=1:1 to 1:20, from the viewpoint of moldability.

The weight average polymerization degree of the cellulose mixed acid ester is preferably from 100 to 1,200, more preferably from 150 to 1,000, and even more preferably from 200 to 600, from the viewpoint of mechanical properties and moldability.

In the resin composition according to the exemplary embodiment, the cellulose mixed acid ester preferably accounts for 50% by mass or more of the total amount of the resin components in the resin composition, and more preferably accounts for 60% by mass or more.

The resin composition according to the exemplary embodiment preferably contains a cellulose mixed acid ester as a main component. The main component of the resin composition is a chemical that accounts for 50% by mass or more of the entire resin composition. The proportion of the cellulose mixed acid ester in the entire resin composition according to the exemplary embodiment is preferably 50% by mass or more, and more preferably 60% by mass or more.

[Esterified Starch]

An esterified starch is also referred to as a starch ester.

Since the esterified starch has a high affinity for the cellulose ester, it is difficult to precipitate out (bleed out) in the resin composition containing the cellulose ester and the resin molded body.

Examples of the esterified starch in the exemplary embodiment include esterified starch esterified with carboxylic acid, esterified starch esterified with phosphoric acid, and the like, and esterified starch esterified with a carboxylic acid is preferable. The carboxylic acid may be an aliphatic carboxylic acid or an aromatic carboxylic acid. An esterified starch esterified with a carboxylic acid has a structure in which at least a part of a hydroxyl group of starch is substituted with an acyl group.

One exemplary embodiment of the esterified starch includes esterified starch esterified with an aliphatic carboxylic acid. Examples of the aliphatic carboxylic acid for esterifying starch include acetic acid (total carbon number of 2), propionic acid (total carbon number of 3), butanoic acid (total carbon number of 4), pentanoic acid (total carbon number of 5), hexanoic acid (total carbon number of 6), octanoic acid (total carbon number of 8), decanoic acid (total carbon number of 10), dodecanoic acid (also known as lauric acid, total carbon number of 12), tetradecanoic acid (also known as myristic acid, total carbon number of 14), hexadecanoic acid (also known as palmitic acid, total carbon number of 16), and octadecane acid (also known as stearic acid, total carbon number of 18). As the aliphatic carboxylic acid for esterifying the starch, an aliphatic carboxylic acid having a total carbon number of 2 to 18 is preferable, and a linear aliphatic carboxylic acid having a total carbon number of 2 to 18 is more preferable. That is, the acyl group contained in the esterified starch is preferably an aliphatic acyl group having a total carbon number of 2 to 18, and more preferably a linear aliphatic acyl group having the same number of carbon atoms.

The degree of esterification of the esterified starch (acyl group substitution degree when esterified with carboxylic acid) is preferably from 1.0 to 3.0, more preferably from 1.2 to 2.8, and still more preferably from 1.4 to 2.6, from the viewpoint of affinity for the cellulose mixed acid ester.

The weight average polymerization degree of the esterified starch is preferably 15 or more and 1500 or less, more preferably 30 or more and 1000 or less, still more preferably 40 or more and 200 or less, and still further preferably 45 or more and 160 or less, from the viewpoint of affinity for the cellulose mixed acid ester.

The esterified starch may be used alone or in combination of two or more types thereof.

The mass ratio (esterified starch/cellulose mixed acid ester) of the esterified starch to the cellulose mixed acid ester in the resin composition according to the exemplary embodiment is preferably from 0.03 to 1, more preferably from 0.05 to 1, still more preferably from 0.1 to 0.8, and still more preferably from 0.2 to 0.8, from the viewpoints of improving the thermal fluidity of the resin composition and improving the rigidity of the molded body.

[Other Components]

The resin composition according to the exemplary embodiment may contain a plasticizer other than the esterified starch. The proportion of the other plasticizer in the entire resin composition is preferably from 0% by mass to 20% by mass, more preferably from 0% by mass to 15% by mass, and still more preferably from 0% by mass to 6% by mass. Here, "0% by mass" means that no other plasticizer is contained. The smaller the proportion of the other plasticizer, the higher the rigidity of the molded body, and also the precipitation of the plasticizer (bleed-out) is suppressed.

Other plasticizers include, for example, adipic acid esters (eg, adipic acid diester, adipic acid polyester), polyether ester, sebacic acid ester, glycol ester, acetate ester, dibasic acid ester, phosphate ester, phthalic acid ester, citrate ester, stearic acid ester, metal soap, camphor, polyol, polyalkylene oxide, and the like. These plasticizers may be used alone or in combination of two or more types thereof.

The resin composition according to the exemplary embodiment may contain a resin other than the cellulose mixed acid ester. Examples of other resins include known thermoplastic resins, and specific examples thereof include polycarbonate resins; p; polypropylene resins; polyester resins; polyolefin resins; polyester carbonate resins; polyphenylene ether resins; polyphenylene sulfide resins; polysulfone resins; polyether sulfone resins; polyarylene resins; polyetherimide resins; polyacetal resins; polyvinyl acetal resins; polyketone resins; polyetherketone resins; polyether ether ketone resins; polyaryl ketone resins; polyether nitrile resins; Liquid crystal resins; polybenzimidazole resins; polyparabanic acid resin; a vinyl-based polymer or a copolymer resin obtained by polymerizing or copolymerizing one or more vinyl monomers selected from the group consisting of an aromatic alkenyl compound, a methacrylic acid ester, an acrylic acid ester, and a vinyl cyanide compound; diene-aromatic alkenyl compound copolymer resins; cyanidized vinyl-diene-aromatic alkenyl compound copolymer resins; aromatic alkenyl compound-diene-cyanidated vinyl-N-phenyl maleimide copolymer resin; vinyl cyanide (ethylene-diene-propylene (EPDM))-aromatic alkenyl compound copolymer resin; vinyl chloride resins; chlorinated vinyl chloride resins; and the like. These resins may be used alone or in combination of two or more types thereof.

The resin composition according to the exemplary embodiment may contain other components other than those described above as necessary. Examples of other components include a flame retardant, a compatibilizer, an antioxidant, a release agent, a light stabilizer, a weathering agent, a colorant, a pigment, a modifier, a dripping inhibitor, an antistatic agent, a hydrolysis inhibitor, a filler, a reinforcing agent (glass fiber, carbon fiber, talc, clay, mica, glass flake, milled glass, glass beads, crystalline silica, alumina, silicon nitride, aluminum nitride, boron nitride, etc). The content of these components is preferably 0 mass % or more and 5 mass % or less with respect to the entire resin composition. Here, "0% by mass" means that other components are not included.

[Method for Producing Resin Composition]

The resin composition according to the exemplary embodiment is produced, for example, by melt-kneading a mixture of a cellulose mixed acid ester and an esterified starch. Examples of the means for melt-kneading include known means, and specific examples thereof include a twin-screw extruder, a Henschel mixer, a Banbury mixer, a single screw extruder, a multi-screw extruder, and a co-kneader. The temperature at the time of kneading may be set according to the melting point of the cellulose mixed acid ester or the esterified starch, and is preferably 140° C. or more and 240° C. or less, more preferably 160° C. or more and 200° C. or less, from the viewpoint of suppressing thermal decomposition while melting the material.

<Resin Molded Body>

The resin molded body according to the exemplary embodiment contains the resin composition according to the exemplary embodiment.

In the resin molded body according to the exemplary embodiment, the cellulose mixed acid ester preferably accounts for 50% by mass or more of the total amount of the resin components in the resin molded body, and more preferably accounts for 60% by mass or more.

The resin molded body according to the exemplary embodiment preferably contains a cellulose mixed acid ester as a main component. The main component of the resin molded body is a chemical that accounts for 50% by mass or more of the entire resin molded body. The ratio of the cellulose mixed acid ester in the entire resin molded body according to the exemplary embodiment is preferably 50% by mass or more, and more preferably 60% by mass or more.

The resin molded body according to the exemplary embodiment is obtained by molding the resin composition according to the exemplary embodiment. Examples of the molding method include injection molding, extrusion molding, blow molding, hot press molding, calender molding, coating molding, cast molding, dipping molding, vacuum molding, transfer molding, and the like.

The molding method of the resin molded body according to the present invention is preferably injection molding from the viewpoint of high degree of freedom in shape. The injection molding is a molding method in which a resin composition is heated and melted, poured into a mold, and solidified to obtain a molded body. It may be molded by injection compression molding.

When the resin molded body according to the exemplary embodiment is molded by injection molding, the cylinder temperature is, for example, 140° C. or more and 260° C. or less, preferably 150° C. or more and 230° C. or less, and more preferably 160° C. or more and 200° C. or less. The mold temperature is, for example, 30° C. or more and 120° C. or less, and preferably 40° C. or more and 80° C. or less. The injection molding may be performed using commercially available equipment such as NEX 500, NEX 300, NEX 150 manufactured by NISSEI PLASTIC INDUSTRIAL CO., Ltd, or SE50D manufactured by SUMITOMO MACHINE CORPORATION, for example.

The tensile elastic modulus of the resin molded body according to the present invention is preferably 1000 MPa or more and 3000 MPa or less, depending on the application of the resin molded body.

The resin molded body according to the exemplary embodiment is suitably used for applications such as electronic and electrical equipment, office equipment, home appliances, vehicle interior materials, engine covers, vehicle bodies, and containers. More specifically, a housing of an electronic appliance or a home appliance; various parts of electronic appliances and home appliances; vehicle interior parts; storage cases of CD-ROM and DVD, etc.; tableware; beverage bottles; food trays; wrap materials; films; sheets; and the like.

EXAMPLES

Hereinafter, exemplary embodiments of the present disclosure will be described in detail with reference to examples, but exemplary embodiments of the present disclosure are not limited to these examples.

<Preparation of Cellulose Ester>
[Preparation of Cellulose Ester CE1]

A commercially available cellulose acetate (L50, manufactured by Daicel Corporation) was prepared as the cellulose ester CE1.

[Preparation of Cellulose Ester CE2]

Commercially available cellulose acetate propionate (CAP 482-20, manufactured by Eastman Chemical Company) was prepared as cellulose ester CE2.

[Preparation of Cellulose Ester CE3]

Commercially available cellulose acetate butyrate (CAB381-20, manufactured by Eastman Chemical Company) was prepared as cellulose ester CE3.

[Preparation of Cellulose Ester CE4]

Commercially available cellulose acetate butyrate (CAB171-15, manufactured by Eastman Chemical Company) was prepared as cellulose ester CE4.

The polymerization degree and degree of substitution of the cellulose esters CE1 to CE4 are shown in Table 1. In Table 1, DPw represents a weight average polymerization degree, and DS (Ac), DS (Pr), and DS (Bt) each represent a degree of substitution of an acetyl group, a propionyl group, or a butyryl group.

TABLE 1

| Cellulose Ester | DPw | DS (Ac) | DS (Pr) | DS (Bt) | Sum of Degree of Substitution |
|---|---|---|---|---|---|
| CE1 | 570 | 2.45 | — | — | 245 |
| CE2 | 600 | 0.18 | 2.49 | — | 2.67 |
| CE3 | 610 | 1.00 | — | 1.66 | 2.66 |
| CE4 | 560 | 2.0 | — | 0.7 | 2.7 |

<Preparation of Esterified Starch>
[Preparation of Esterified Starch SE1]

Commercially available esterified starch (CORNPOL CP-3CL-L from JAPAN CORN STARCH CO., Ltd, DS (short chain fatty acid)=1.6 to 1.9, DS (long chain fatty acid)=0.3, weight average polymerization degree of 66)) was prepared as esterified starch SE 1. The esterified starch SE 1 is an esterified starch esterified with acetic acid (acetyl group) and stearic acid (stearyl group).

[Preparation of Esterified Starch SE2]

An esterified starch SE 2 was prepared by the following procedure. 100 g of corn starch (HS-7 from J-OIL MILLS, INC) and 700 ml of dimethyl sulfoxide were placed in a 2 L reaction vessel and stirred at 80° C. for 4 hours to dissolve the starch. 110 g of sodium hydrogen carbonate and 5.3 g of dimethylaminopyridine which was dissolved in 75 mL of dimethyl sulfoxide were added to this solution, the solution was stirred until the temperature of the solution reaches 45° C. and then 131 g of propionic anhydride was added dropwise to the solution over 1 hour. The mixture was stirred for 15 minutes after the dropping, and the reaction solution was added dropwise to 3.2 L of pure water over 2 hours. The solid was filtered, poured again into 3.2 L of pure water, and washed. This washing was performed four times, and the obtained solid was dried at 60° C. for 72 hours to obtain esterified starch SE 2 (DS (Pr)=1.4, weight-average polymerization degree 155) of 119 g esterified with propionic acid (propionyl group).

<Preparation of Plasticizer>
[Preparation of Plasticizer P1]

A commercially available bis (2-ethylhexyl) adipate (manufactured by Tokyo Chemical Industry Co., Ltd.) was prepared as a plasticizer P1.

[Preparation of Plasticizer P2]

A commercially available polyether ester plasticizer (RS-1000 manufactured by ADEKA Corporation) was prepared as a plasticizer P2.

[Preparation of Plasticizer P3]

A commercially available condensation phosphoric acid ester-based plasticizer (PX 200, manufactured by DAIHACHI Chemical Industry Co., Ltd.) was prepared as a plasticizer P3.

[Preparation of Plasticizer P4]

A commercially available adipic acid ester-containing compound (Daifatty101, manufactured by DAIHACHI Chemical Industry Co., Ltd.) was prepared as a plasticizer P4.

<Preparation of Resin Composition (Pellet)>

The resin composition (pellet) was obtained by using a biaxial kneader (LTE 20-44, manufactured by Labtech Engineering Co., Ltd.) at a charge composition and cylinder temperature shown in Table 2. In Table 2, "SE/CE" represents the mass ratio of the esterified starch to the cellulose ester (esterified starch/cellulose ester), and "overload" means that the melt viscosity was too high and cannot be measured.

<Injection Molding of Test Specimen>

Using an injection molding machine (NEX 140111, manufactured by NISSEI PLASTIC INSUSTRIAL Co., Ltd), an ISO multi-purpose dumbbell test specimen (measuring unit size: 10 mm in width, 4 mm in thickness), and an ISO small square plate test specimen (60 mm in length of the square plate, 60 mm in width of the square plate, and 2 mm in thickness) were formed from the obtained pellets.

<Evaluation Test>
[Melt Viscosity]

The melt viscosity (Pa·s) of the resin composition (pellet) was measured at a temperature shown in Table 2 and at a shear rate of 1216/s shown in accordance with JIS K 7199: 1999 using a capillary rheometer (CAPILOGRAPH-1C, manufactured by Toyo Seiki Seisaku-sho, Ltd.). The measured values are shown in Table 2.

[Tensile Modulus]

Using an ISO multi-purpose dumbbell test specimen, a tensile elastic modulus (MPa) was measured in accordance with ISO 527 using a universal testing apparatus (Autograph AG-Xplus manufactured by Shimadzu Corporation). The measured values are shown in Table 2.

[Bleed Out Test]

Characters were written on the surface of the ISO small square plate test specimen with an oil-based ink, and the test specimen was left for 1000 hours in an environment with a temperature of 65° C./relative humidity of 90%. The test specimen surface was visually observed, and the properties of the test specimen surface were classified as follows. Table 2 shows the results. G 1 (o): No bleeding of characters and no component precipitation (bleed-out). NG (x): Bleeding of characters occurred, or apparently component precipitation (bleed-out) occurred.

modulus of the molded body of the cellulose mixed acid ester was improved by adding the esterified starch.

TABLE 2

| | Composition (parts by mass) | | | | | Cylinder Temperature (° C.) | Melt Viscosity (Pa · s) | Temperature Measuring Melt Viscosity (° C.) | Tensile Elastic Modulus (MPa) | Bleed out |
|---|---|---|---|---|---|---|---|---|---|---|
| | Cellulose Ester | Esterified Starch | | Plasticizer | SE/CE | | | | | |
| Comparative Example A | — | 0 | SE1 | 100 | — | 0 | — | 170 | 177 | 170 | 1010 | G1(o) |
| Comparative Example B | — | 0 | SE2 | 100 | — | 0 | — | 170 | 328 | 170 | 980 | G1(o) |
| Comparative Example 1 | CE1 | 100 | — | 0 | — | 0 | 0 | 260 | overload | 250 | 3700 | G1(o) |
| Comparative Example 2 | CE1 | 80 | SE1 | 20 | — | 0 | 0.25 | 240 | 351 | 250 | 2820 | G1(o) |
| Comparative Example 3 | CE1 | 60 | SE1 | 40 | — | 0 | 0.67 | 240 | 225 | 250 | 2550 | G1(o) |
| Comparative Example 4 | CE1 | 80 | SE2 | 20 | — | 0 | 0.25 | 240 | 480 | 250 | 2610 | G1(o) |
| Comparative Example 5 | CE1 | 60 | SE2 | 40 | — | 0 | 0.67 | 240 | 386 | 250 | 2470 | G1(o) |
| Comparative Example 6 | CE1 | 90 | — | 0 | P4 | 10 | 0 | 240 | 299 | 250 | 3300 | G1(o) |
| Comparative Example 7 | CE1 | 80 | SE1 | 10 | P4 | 10 | 0.13 | 240 | 302 | 250 | 2930 | G1(o) |
| Comparative Example 8 | CE1 | 80 | SE2 | 10 | P4 | 10 | 0.13 | 240 | 356 | 250 | 2690 | G1(o) |
| Comparative Example 9 | CE2 | 100 | — | 0 | — | 0 | 0 | 220 | 654 | 220 | 1830 | G1(o) |
| Comparative Example 10 | CE2 | 96 | — | 0 | P1 | 4 | 0 | 200 | 223 | 220 | 1670 | G1(o) |
| Comparative Example 11 | CE2 | 88 | — | 0 | P1 | 12 | 0 | 190 | 177 | 220 | 1220 | NG(x) |
| Comparative Example 12 | CE2 | 88 | — | 0 | P2 | 12 | 0 | 190 | 185 | 220 | 1290 | NG(x) |
| Comparative Example 13 | CE2 | 88 | — | 0 | P3 | 12 | 0 | 190 | 160 | 220 | 1140 | NG(x) |
| Comparative Example 14 | CE3 | 100 | — | 0 | — | 0 | 0 | 210 | 705 | 210 | 1630 | G1(o) |
| Comparative Example 15 | CE4 | 100 | — | 0 | — | 0 | 0 | 240 | 548 | 240 | 2300 | G1(o) |
| Example 1 | CE2 | 97 | SE1 | 3 | — | 0 | 0.03 | 220 | 622 | 220 | 1880 | G1(o) |
| Example 2 | CE2 | 95 | SE1 | 5 | — | 0 | 0.05 | 210 | 472 | 220 | 1890 | G1(o) |
| Example 3 | CE2 | 80 | SE1 | 20 | — | 0 | 0.25 | 200 | 211 | 220 | 2100 | G1(o) |
| Example 4 | CE2 | 60 | SE1 | 40 | — | 0 | 0.67 | 190 | 110 | 220 | 2280 | G1(o) |
| Example 5 | CE2 | 50 | SE1 | 50 | — | 0 | 1.0 | 190 | 95 | 220 | 1990 | G1(o) |
| Example 6 | CE2 | 75 | SE1 | 20 | P1 | 5 | 0.27 | 190 | 170 | 220 | 1810 | G1(o) |
| Example 7 | CE2 | 75 | SE1 | 20 | P2 | 5 | 0.27 | 190 | 192 | 220 | 1880 | G1(o) |
| Example 8 | CE2 | 75 | SE1 | 20 | P3 | 5 | 0.27 | 190 | 165 | 220 | 1790 | G1(o) |
| Example 9 | CE2 | 97 | SE2 | 3 | — | 0 | 0.03 | 220 | 640 | 220 | 1840 | G1(o) |
| Example 10 | CE2 | 95 | SE2 | 5 | — | 0 | 0.05 | 210 | 587 | 220 | 1850 | G1(o) |
| Example 11 | CE2 | 80 | SE2 | 20 | — | 0 | 0.25 | 200 | 322 | 220 | 2050 | G1(o) |
| Example 12 | CE2 | 60 | SE2 | 40 | — | 0 | 0.67 | 190 | 121 | 220 | 2110 | G1(o) |
| Example 13 | CE2 | 50 | SE2 | 50 | — | 0 | 1.0 | 190 | 107 | 220 | 1880 | G1(o) |
| Example 14 | CE3 | 97 | SE1 | 3 | — | 0 | 0.03 | 210 | 684 | 210 | 1660 | G1(o) |
| Example 15 | CE3 | 95 | SE1 | 5 | — | 0 | 0.05 | 200 | 556 | 210 | 1670 | G1(o) |
| Example 16 | CE3 | 80 | SE1 | 20 | — | 0 | 0.25 | 190 | 224 | 210 | 1880 | G1(o) |
| Example 17 | CE3 | 60 | SE1 | 40 | — | 0 | 0.67 | 180 | 207 | 210 | 2050 | G1(o) |
| Example 18 | CE3 | 50 | SE1 | 50 | — | 0 | 1.0 | 180 | 153 | 210 | 1710 | G1(o) |
| Example 19 | CE4 | 97 | SE1 | 3 | — | 0 | 0.03 | 240 | 520 | 240 | 2380 | G1(o) |
| Example 20 | CE4 | 95 | SE1 | 5 | — | 0 | 0.05 | 230 | 499 | 240 | 2390 | G1(o) |
| Example 21 | CE4 | 80 | SE1 | 20 | — | 0 | 0..25 | 220 | 366 | 240 | 2630 | G1(o) |
| Example 22 | CE4 | 60 | SE1 | 40 | — | 0 | 0.67 | 210 | 244 | 240 | 2410 | G1(o) |
| Example 23 | CE4 | 50 | SE1 | 50 | — | 0 | 1.0 | 210 | 210 | 240 | 2360 | G1(o) |

As shown in Examples and Comparative Examples, by adding the esterified starch to the cellulose ester, the thermal fluidity of the cellulose ester composition was improved (the melt viscosity decreased). Further, the addition of the esterified starch did not cause component precipitation (bleed-out) in the molded body.

As shown in Comparative Examples 1 to 8, when the esterified starch was added to the cellulose ester CE1 (cellulose acetate), the tensile elastic modulus of the molded body was decreased, and the higher the amount of the esterified starch added, the lower the tensile elastic modulus.

On the other hand, as shown in Comparative Examples 9, 14 and 15 and Examples 1 to 23, by adding esterified starch to cellulose ester CE2 (cellulose acetate propionate), cellulose ester CE3 (cellulose acetate butyrate) or cellulose ester CE4 (cellulose acetate butyrate), the tensile elastic modulus of the molded body was improved. Here, although the tensile elastic modulus of the molded body composed of only the esterified starch was lower than the tensile elastic modulus of the molded body composed of only the cellulose mixed acid ester (see Comparative Examples A and B and Comparative Examples 9, 14 and 15), the tensile elastic modulus of the molded body of the cellulose mixed acid ester was improved by adding the esterified starch.

Although the invention has been described in detail with reference to specific exemplary embodiments, it will be apparent to those skilled in the art that various changes and modifications can be made without departing from the spirit and scope of the invention.

The invention claimed is:
1. A resin composition comprising:
   cellulose acetate propionate; and
   an esterified starch; wherein
   the esterified starch is either
      an esterified starch esterified with acetyl group and stearyl group that is present in an amount of 40 parts by mass to 50 parts by mass with respect to 100 parts by mass of a total amount of the cellulose acetate propionate and the esterified starch, or
      an esterified starch esterified with propionyl group that is present in an amount of 40 parts by mass to 50 parts by mass with respect to 100 parts by mass of a total amount of the cellulose acetate propionate and the esterified starch;
   an acyl group substitution degree of the cellulose acetate propionate is from 1.0 to 3.0;

a degree of esterification of the esterified starch is from 1.0 to 3.0;

the cellulose acetate propionate has a weight average polymerization degree of from 100 to 1,200;

the cellulose acetate propionate accounts for 50% by mass to 97% by mass of a total amount of resin components present in the resin composition; and the esterified starch accounts for 3% by mass to 50% by mass of the total amount of resin components present in the resin composition.

2. A resin molded body comprising the resin composition according to claim 1.

3. The resin molded body according to claim 2, wherein the resin molded body is an injection molded body.

4. The resin composition according to claim 1, wherein: the esterified starch is the esterified starch esterified with acetyl group and stearyl group.

5. The resin composition according to claim 1, wherein: the esterified starch is the esterified starch esterified with propionyl group.

6. The resin composition according to claim 1, wherein an amount of cellulose acetate propionate is from 50% by mass to 60% by mass of the total amount of resin components present in the resin composition.

7. The resin composition according to claim 1, wherein the esterified starch accounts for 5% by mass to 50% by mass of the total amount of resin components present in the resin composition.

8. The resin composition according to claim 1, wherein the esterified starch accounts for 20% by mass to 50% by mass of the total amount of resin components present in the resin composition.

* * * * *